United States Patent [19]

Efros et al.

[11] Patent Number: 4,968,327
[45] Date of Patent: Nov. 6, 1990

[54] MOULDING COMPOSITION TO PRODUCE ABRASIVE TOOLING

[75] Inventors: Mikhail G. Efros, Leningrad; Zoya M. Prozorova, Leningrad; Svetlana M. Fedotova, Leningrad; Vadim S. Burov, Leningrad; Vyacheslav M. Kolomazin, all of Leningrad; Grigory I. Lemesh, Malaya Vishera, all of U.S.S.R.

[73] Assignee: Nauchno-Proizvodstvennoe Obiedinenie Po Abrazivam, Lenningrad, U.S.S.R.

[21] Appl. No.: 334,913

[22] Filed: Apr. 6, 1989

[51] Int. Cl.$^5$ .............................................. B24D 3/02
[52] U.S. Cl. ........................................ 51/309; 51/307; 51/308; 106/38.27
[58] Field of Search .................... 51/307, 308, 309; 106/38.27

[56] References Cited

FOREIGN PATENT DOCUMENTS 517203  8/1974  U.S.S.R. .
634923  11/1978  U.S.S.R. .
931446  5/1982  U.S.S.R. .

Primary Examiner—William R. Dixon, Jr.
Assistant Examiner—Willie Thompson
Attorney, Agent, or Firm—Ladas & Parry

[57] ABSTRACT

The composition is formulated as follows, in percent by weight:
  synthetic corundum material: 76.5 to 90.0
  kaolinite: 2.1 to 5.7
  feldspar: 2.8 to 7.6
  adhesive and moistening ingredient: 3.0 to 4.5
  calcium borosilicate frit: 2.1 to 5.7

Calcium borosilicate frit compositon, in percent by weight, is as follows:
  silicon oxide: 22.0 to 38.0
  aluminium oxide: 14.5 to 15.5
  boron oxide: 25.0 to 35.0
  calcium oxide: 12.5 to 17.5
  sodium oxide: 4.0 to 7.5
  potassium oxide: 2.0 to 3.5

The boron oxide-to-calcium oxide ratio is within 1.5 to 2.5.

1 Claim, No Drawings

MOULDING COMPOSITION TO PRODUCE ABRASIVE TOOLING

FIELD OF THE INVENTION

The present invention relates to the field of abrasive tooling production and, more specifically, to moulding compositions based on synthetic corundum materials and ceramic bonding agents that can be used for the fabrication of abrasive tools.

BACKGROUND OF THE INVENTION

An abrasive tool is fabricated by compacting a moulding composition to impart the geometrical form of the tool in question, drying the moulding composition thus formed, and firing it, as a concluding step. While the abrasive tool is fired at a high temperature (1250° to 1300° C.), the ceramic bond will melt and pass, completely or partically, into a liquid state to coat and envelope the abrasive synthetic corundum grains and to bond together said abrasive grains while subsequently cooling down and solidifying as the temperature is decreased. The moulding, drying, and firing conditions for moulding compositions in abrasive tooling manufacturing processes are generally known.

A moulding composition should meet the following basic requirements:
  abrasive tooling produced from said moulding composition should have high mechanical strength;
  abrasive tooling that can be produced from said moulding composition should have a wide hardness range;
  the amount of harmful substances that are evolved into the environment during firing operations in the process of abrasive tooling manufacture should be as low as possible; and
  the moulding composition should be relatively inexpensive and readily available.

The hardness range of abrasive tooling will depend upon the melting temperature of the bonding agent, hence on its composition. As is generally known, in the tool preform firing process the bonding agent dissolves the corundum grains to increase its viscosity. On the other hand, it is known that a larger amount of bond is required to obtain higher hardness in abrasive tooling. However, increasing bond concentration in a moulding composition will lead to the tool preform being deformed in the firing process before the bond has increased in viscosity sufficiently to prevent deformation.

The above requirements that a moulding composition should meet depend in a large measure upon the composition of ceramic bond, which typically includes plasticizer to prevent abrasive tool deformation while fired, ingredients to enhance strength properties in the bonding agent, and a reactive ingredient to assure adhesion for corundum grains. Boron-containing frits are used as reactive ingredients. The frits are named to reflect the presence of oxides that determine their properties.

There is known a moulding composition to produce abrasive tooling (SU, A, 634923), which contains synthetic corundum material and a bonding agent. The bonding agent comprises kaolin as plasticizer, talc as an ingredient to increase bond strength properties, and a borosilicate frit as reactive ingredient. The proportions of the bond ingredients, in per cent by weight, are as follows:
  kaolin: 40 to 95
  borosilicate frit: 4 to 40
  talc: 1 to 20

Composition of the borosilicate frit, in per cent by weight, is as follows:
  silicon oxide: 67.8 to 70.0
  aluminium oxide: 3.3 to 3.6
  magnesium oxide: 0.77 to 0.9
  calcium oxide: 0.53 to 0.6
  iron oxide: 0.1 to 0.23
  sodium oxide: 3.1 to 3.6
  potassium oxide: 4.0 to 4.8
  boron oxide: 15.6 to 17.7

However, tooling fabricated from this moulding composition is not strong enough owing to the relatively low adhesion between said borosilicate frit and corundum grains, the result of a low boron oxide concentration in said frit.

Another prior-art moulding composition to produce abrasive tooling (SU, A, 517203) comprises synthetic corundum material and bond. The bond comprises fireclay as a plasticizer, feldspar as an ingredient to increase bond strength properties, and lithium borosilicate frit and cryolite as reactive ingredients.

The proportions of the bond ingredients, in per cent by weight, are as follows:
  lithium borosilicate frit: 15.0 to 60.0
  fireclay: 0.1 to 40.0
  feldspar: 15.0 to 60.0
  cryolite: 5.0 to 15.0

Lithium borosilicate frit in this case has the following composition, in per cent by weight:
  silicon oxide: 64.0 to 75.0
  boron oxide: 10.0 to 18.0
  aluminium oxide: 2.0 to 8.0
  iron oxide: 0.1 to 0.5
  magnesium oxide: 1.0 to 2.0
  calcium oxide: 0.1 to 1.0
  sodium oxide: 3.5 to 6.4
  potassium oxide: 3.5 to 4.6
  lithium oxide: 4.0 to 6.0

Tooling fabricated from this moulding composition is somewhat stronger than in the case of the previous counterpart, owing to the higher aggregate adhesive capacity of lithium borosilicate frit and cryolite relative to corundum grains.

However the lower melting temperature of the bond (ca. 800° C.) comprised in this moulding composition and due to the presence of the low-melting ingredients of lithium and cryolite, will limit the hardness range of abrasive tooling that can be prepared from this moulding composition. Besides, as cryolite contains about 50% fluorine, harmful substances are evolved into the environment in fairly large amounts in the abrasive tooling production process. One other disadvantage of this moulding composition is that it is not readily available and costs rather high—because of the lithium borosilicate frit contained therein, an expensive product and in short supply.

There is known a moulding comoposition to produce abrasive tooling (SU, A, 931446), with the composition, in per cent by weight, as follows:
  synthetic chrome-titanium corundum: 69 to 90
  kaolin: 1.4 to 5.0
  feldspar: 0.7 to 2.5
  lithium borosilicate frit: 2.1 to 7.5
  cryolite: 0.7 to 2.5
  adhesive and moistening ingredient (water glass): 3.0 to 6.0 barium silicate frit: 2.1 to 7.5

The adhesive and moistening ingredient is purposed to impart mouldability to the moulding composition.

The adhesive and moistening ingredients that can be used in moulding compositions include water glass and paraffin emulsion. The term "water glass" denotes the widely known aqueous sodium silicate solution. The paraffin emulsion formulations usable in moulding compositions are generally known.

The incorporation of barium silicate frit into the moulding formulation leads to higher melting temperature for the moulding composition, thus to a broader hardness range for the abrasive tooling, compared to the previous counterpart, yet the strength of the abrasive tooling produced from this moulding composition still remains insufficiently high. Besides, this moulding composition is not readily available and relatively costly, just as the previous counterpart. And harmful substances are evolved into the environment in rather large amounts in the process of fabricating it into abrasive tooling.

SUMMARY OF THE INVENTION

It is an object of the present invention to provide a moulding composition which makes it possible to increase the mechanical strength of abrasive tooling produced therefrom.

Another object of the invention is to provide a moulding composition expanding the hardness range for the abrasive tooling that can be produced therefrom.

A further object of the invention is to reduce the level of harmful substances evolving into the environment in the process of manufacturing abrasive tooling.

Finally, it is an object of the invention to reduce the cost of the inventive moulding composition and make it more readily available.

With these and other objects in view, there is provided a moulding composition to produce abrasive tooling, comprising a synthetic corundum material, kaolinite, feldspar, an adhesive and moistening ingredient, and calcium borosilicate frit, with the proportions of ingredients, in per cent by weight, being as follows:

synthetic corundum material: 76.5 to 90.0
kaolinite: 2.1 to 5.7
feldspar: 2.8 to 7.6
adhesive and moistening ingredient: 3.0 to 4.5
calcium borosilicate frit: 2.1 to 5.7

The calcium borosilicate frit has the following composition, in per cent by weight:

silicon oxide: 22.0 to 38.0
aluminium oxide: 14.5 to 15.5
boron oxide: 25.0 to 35.0
calcium oxide: 12.5 to 17.5
sodium oxide: 4.0 to 7.5
potassium oxide: 2.0 to 3.5

The ratio of boron oxide to calcium oxide is within 1.5 to 2.5.

Kaolinite is understood here to denote either fireclay or kaolin. The authors have established experimentally that the adhesive capacity of calcium borosilicate frit of the above composition with respect to corundum grains is higher than that of other known frits. The increase in the adhesive capacity of said calcium borosilicate frit leads to a higher mechanical strength in tooling that can be fabricated from a moulding composition of the proposed formulation.

The presence in the moulding composition of calcium oxide in an amount of between 12.5 to 17.5% by weight provides for a melting temperature of the bond (ca. 1100° C.) such that will permit this moulding composition to be used for fabricating abrasive tooling over the entire hardness range customary for the abrasive industry.

Besides, the proposed moulding composition contains no ingredients that would be expensive or in short supply, nor any ingredients that would favour harmful environmental evolutions in substantial amounts in the process of abrasive tooling fabrication.

The authors have established that with the concentration of calcium borosilicate frit in the moulding composition below 2.1% by weight, as well as with the concentration in the calcium borosilicate frit of boron oxide below 25.0% or calcium oxide exceeding 17.5%, there is a drastic decrease in the adhesive capacity of said frit relative to corundum grains, hence in the mechanical strength of tooling that can be prepared from said moulding composition. A sharp decrease in the adhesive capacity of calcium borosilicate frit relative to corundum grains is also to be observed where the boron oxide-to-calcium oxide ratios are below 1.5.

The authors have found also that with the concentration of calcium borosilicate frit in the moulding composition above 5.7% by weight, as well as with the concentration in the calcium borosilicate frit of boron oxide above 35.0% by weight or calcium oxide below 12.5% by weight, there is a substantial decrease in the melting temperature of the bonding agent, hence in the hardness range of abrasive tooling that can be produced from said moulding composition. A substantial decrease in the melting temperature of the bonding agent is also to be observed where the boron oxide-to-calcium oxide ratios exceed 2.5.

The concentrations of other ingredients in the moulding composition have been determined experimentally based on the requirements to be met by moulding compositions.

PREFERRED EMBODIMENT OF THE INVENTION

The moulding composition was obtained as follows. First, a blend was prepared composed of kaolinite, feldspar, and calcium borosilicate frit. Then a synthetic corundum material was taken, thus white corundum, chrometitanium corundum or some other, to be moistened with water glass or paraffin emulsion and mixed with the previously prepared blend. The ingredients were taken in proportions to suit the proposed invention.

Subsequently, the moulding composition was used to fabricate abrasive tools. The technology to use for fabricating abrasive tooling from moulding compositions is generally known.

To determine the mechanical strength and hardness range of abrasive tooling that can be produced from the proposed moulding composition, moulding formulations were used with different proportions (concentrations) of ingredients, to mould them into bar specimens, in accordance with the technology to be used for abrasive tooling manufacture, and test said bar specimens for mechanical strength (resistance to bending). The generally known sand blasting method was used for hardness determinations.

Besides, bar specimens of varied hardness were prepared from a moulding composition of a known formulation and suitably tested.

Table 1 summarizes the formulations of moulding compositions used to mould test bar specimens. Concentrations of ingredients are given in per cent by weight.

TABLE 1

| Sl. No. | Moulding composition ingredients | 1 | 2 | 3 | 4 | 5 | 6 | 7 | 8 | 9 | 10 | 11 | 12 | 13 | 14 | 15 known formulation |
|---|---|---|---|---|---|---|---|---|---|---|---|---|---|---|---|---|
| 1 | Synthetic corundum material | 90.0 | 83.2 | 76.5 | 90.0 | 83.3 | 76.5 | 90.0 | 76.5 | 83.2 | 76.5 | 83.2 | 76.5 | 83.2 | 76.5 | 69–40 |
| 2 | Kaolin | 2.1 | 3.9 | 5.7 | 2.1 | 3.9 | 5.7 | 2.1 | 5.5 | 3.9 | 5.7 | 3.9 | 5.7 | 3.9 | 5.7 | 1.4–5.0 |
| 3 | Feldspar | 2.8 | 5.2 | 7.6 | 2.8 | 5.2 | 7.6 | 3.0 | 7.5 | 5.2 | 7.6 | 5.2 | 7.6 | 5.2 | 7.6 | 0.7–2.5 |
| 4 | Water glass | 3.0 | 3.8 | 4.5 |  |  |  | 3.1 | 4.5 | 3.8 | 4.5 | 3.8 | 4.5 | 3.8 | 4.5 | 3.0–6.0 |
| 5 | Paraffin emulsion |  |  |  | 3.0 | 3.8 | 4.5 |  |  |  |  |  |  |  |  |  |
| 6 | Lithium borosilicate frit |  |  |  |  |  |  |  |  |  |  |  |  |  |  | 2.1–7.5 |
| 7 | Cryolite |  |  |  |  |  |  |  |  |  |  |  |  |  |  | 0.7–2.5 |
| 8 | Barium silicate frit |  |  |  |  |  |  |  |  |  |  |  |  |  |  | 2.1–7.5 |
| 9 | Calcium borosilicate frit | 2.1 | 3.9 | 5.7 | 2.1 | 3.9 | 5.7 | 1.8 | 6.0 | 3.9 | 5.7 | 3.9 | 5.7 | 3.9 | 5.7 |  |
|  | Calcium borosilicate frit components |  |  |  |  |  |  |  |  |  |  |  |  |  |  |  |
| 10 | -silicon oxide | 38.0 | 33.0 | 22.0 | 38.0 | 33.0 | 22.0 | 33.0 | 33.0 | 34.0 | 22.0 | 28.0 | 35.0 | 32.0 | 27.0 |  |
| 11 | -aluminium oxide | 14.5 | 15.5 | 14.5 | 14.5 | 15.5 | 14.5 | 15.5 | 15.5 | 15.5 | 14.5 | 15.0 | 15.5 | 14.5 | 14.5 |  |
| 12 | -boron oxide | 25.0 | 31.2 | 35.0 | 25.0 | 31.2 | 35.0 | 31.2 | 31.2 | 23.0 | 37.0 | 30.0 | 27.5 | 25.0 | 35.0 |  |
| 13 | -calcium oxide | 16.5 | 12.5 | 17.5 | 16.5 | 12.5 | 17.5 | 12.5 | 12.5 | 17.5 | 15.5 | 19.0 | 11.0 | 17.5 | 12.5 |  |
| 14 | -sodium oxide | 4.0 | 5.0 | 7.5 | 4.0 | 5.0 | 7.5 | 5.0 | 5.0 | 7.0 | 7.5 | 5.0 | 7.5 | 7.5 | 7.5 |  |
| 15 | -potassium oxide | 2.0 | 2.8 | 3.5 | 2.0 | 2.8 | 3.5 | 2.8 | 3.0 | 3.5 | 3.0 | 3.5 | 3.5 | 3.5 |  |  |

The test results obtained on bar specimens prepared from the moulding compositions formulated as shown in Table 1, are summarized in Table 2.

TABLE 2

| Formulation Nos. | Test results Resistance to bending, kgf/cm² | Hardness |
|---|---|---|
| 1 | 450 | soft |
| 2 | 460 | medium hard |
| 3 | 500 | very hard |
| 4 | 420 | soft |
| 5 | 450 | medium hard |
| 6 | 480 | very hard |
| 7 | 400 | soft |
| 8 | Specimen deformed |  |
| 9 | 430 | medium hard |
| 10 | Specimen deformed |  |
| 11 | 420 | medium hard |
| 12 | Specimen deformed |  |
| 13 | 410 | medium hard |
| 14 | Specimen deformed |  |
| 15a | 400 | soft |
| 15b | 430 | medium hard |
| 15c | 460 | very hard |

It follows from Tables 1 and 2 that the proposed moulding composition can be used to produce abrasive tooling over the entire hardness range utilized in the abrasive industry (formulation Nos. 1, 2, 3, 4, 5 and 6). The mechanical strength of a specimen fabricated from this moulding composition (formulation Nos. 1, 2, 3, 4, 5 and 6) is higher than that of a specimen produced from the moulding composition of the known formulation (formulation No. 15).

With the concentration of calcium borosilicate frit in the moulding composition below 2.1% by weight (formulation No. 7), the concentration in the calcium borosilicate frit of boron oxide below 25.0% by weight (formulation No. 9) or calcium oxide above 17.5% by weight (formulation No. 11), and with the boron oxide-to-calcium oxide ratios below 1.5 (formulation No. 13), the strength of a specimen will be substantially reduced compared to that of a specimen prepared from the proposed moulding composition.

With the concentration of calcium borosilicate frit in the moulding composition above 5.7% by weight (formulation No. 8), the concentration in the calcium borosilicate frit of boron oxide above 35% by weight (formulation No. 10) or calcium oxide below 12.5% by weight (formulation No. 12), and with the boron oxide-to-calcium oxide ratios above 2.5 (formulation No. 14), it was found impossible to obtain specimens of high hardness that would be due to a high bond concentration in the moulding composition because the specimen preforms deformed in the firing process.

What is claimed is:

1. A moulding composition to produce abrasive tooling, comprising a synthetic corundum material, kaolinite, feldspar, an adhesive and moistening ingredient, and calcium borosilicate frit, with the proportions of ingredients, in per cent by weight, being as follows:
   synthetic corundum material: 76.5 to 90.0
   kaolinite: 2.1 to 5.7
   feldspar: 2.8 to 7.6
   adhesive and moistening ingredient: 3.0 to 4.5
   calcium borosilicate frit: 2.1 to 5.7
having the following composition, in per cent by weight:
   silicon oxide: 22.0 to 38.0
   aluminium oxide: 14.5 to 15.5
   boron oxide: 25.0 to 35.0
   calcium oxide: 12.5 to 17.5
   sodium oxide: 4.0 to 7.5
   potassium oxide: 2.0 to 3.5
and the ratio of boron oxide to calcium oxide being within 1.5 to 2.5.

* * * * *